United States Patent [19]
Van Camp et al.

[11] Patent Number: 4,610,849
[45] Date of Patent: * Sep. 9, 1986

[54] REACTOR FOR DRY FLUE GAS DESULFURIZATION

[75] Inventors: John Van Camp, Philadelphia, Pa.; Stanley J. Baran, Cherry Hill, N.J.

[73] Assignee: Proctor & Schwartz, Inc., Horsham, Pa.

[*] Notice: The portion of the term of this patent subsequent to Nov. 6, 2001 has been disclaimed.

[21] Appl. No.: 503,607

[22] Filed: Jun. 13, 1983

Related U.S. Application Data

[63] Continuation-in-part of Ser. No. 279,089, Jun. 30, 1981.

[51] Int. Cl.[4] .................. B01D 47/00; F01C 1/00
[52] U.S. Cl. ........................... 422/111; 55/73; 55/224; 55/226; 261/23 R; 261/DIG. 9; 422/168; 422/169; 422/176; 423/242; 423/244
[58] Field of Search .............. 422/111, 170, 172, 168, 422/169, 176; 423/242, 244; 261/23 R, 43, DIG. 9, 78 A; 55/94, 224 A, 226 A, 73

[56] References Cited

U.S. PATENT DOCUMENTS

| | | | |
|---|---|---|---|
| 3,994,706 | 11/1976 | Duvall | 62/11 |
| 4,197,278 | 4/1980 | Gehri et al. | 423/242 |
| 4,260,563 | 4/1981 | Brahlet | 261/23 R |
| 4,310,498 | 1/1982 | Malki et al. | 423/242 |
| 4,4811,171 | 11/1984 | Baran et al. | 422/176 |

FOREIGN PATENT DOCUMENTS

| | | | |
|---|---|---|---|
| 1090640 | 8/1957 | Fed. Rep. of Germany | 261/23 R |
| 642265 | 8/1950 | United Kingdom | 261/23 R |

OTHER PUBLICATIONS

Chemical and Engineering News, "Technology—System to Clean Up High-Sulfur Coal Flue Gas", Dec. 1, 1980, p. 28.

Primary Examiner—David L. Lacey
Assistant Examiner—William R. Johnson
Attorney, Agent, or Firm—Richard H. Thomas

[57] ABSTRACT

A spray reactor for flue gas desulfurization, particularly suitable for steam generators, uses a plurality of flue gas inlets and complementary nozzles to spray an alkaline reagent into the flue gas, including means to maintain the gas velocity in said gas inlets in response to generator turndown by varying the cross-sectional area of flow of the waste gas into the reaction zone.

9 Claims, 6 Drawing Figures

REACTOR FOR DRY FLUE GAS DESULFURIZATION

This is a continuation-in-part of parent application Ser. No. 279,089, filed June 30, 1981, assigned to Assignee of the present application.

The present invention is directed to an improved spray reactor and particularly to an improved apparatus for cleansing waste combustion gases, particularly flue or stack gases from large generating stations. The present invention is especially concerned with the removal of sulfur oxides from such gases. For purposes of the present application, the term "spray reactor" means spray dryers as well as reactors.

BACKGROUND OF THE PRESENT INVENTION

Until recent years, large steam generating stations have been allowed to discharge waste combustion gases to the atmosphere with little or no purification. It has become well established that the escape of such gases, and particularly the acidic oxides therein, can be injurious and harmful to the surrounding environment and its inhabitants.

Particularly objectionable are the sulfur oxides generated in relatively large amounts in the burning of high sulfur-containing coals. These gaseous pollutants may react in the atmosphere to form acids which can have a very deleterious and toxic effect on the environment. This concern about the presence of sulfur oxides in stack gases has increased in recent years due to the shortage of low sulfur fuels such as natural gas, low-sulfur coal and fuel oil.

It is known to spray an atomized lime slurry into a waste stack gas stream for the purpose of reacting the lime with the sulfur oxides in the gas stream. This may be carried out in a conventional spray dryer, producing a dry powder which can be collected in a particulate collection apparatus such as a baghouse fabric filter. For instance, it was reported in the Chemical and Engineering News of Dec. 1, 1980, page 28, that such a system had been put into operation at a boiler at the Argonne National Laboratory in Illinois, converted to burn high-sulfur coal.

A principal problem experienced with such apparatus is that the volume of stack gases produced can vary substantially over a predetermined period, dependent upon the load placed on the generator. At night for instance, the load can be substantially less than during the day, as much as a third or a quarter of the maximum generator load, correspondingly affecting the volume of stack gas produced.

At the same time, the efficiency of reaction between the alkaline or lime slurry and the sulfur oxides is dependent at least in part upon the velocity of the gas flow into which the lime slurry is introduced. One criteria therefore is to maintain as constant a gas flow velocity as possible. By closely controlling velocity and maximizing the efficiency of the reaction, one can thus optimize the ratio of lime slurry to gas flow required for the reaction. This in turn makes it possible to prevent overcooling of the stack gases and the flow into the baghouse filter, insuring that such flow will be relatively dry to avoid condensation within the filter.

BRIEF DESCRIPTION OF THE INVENTION

The present invention resides broadly in a method for cleansing waste stack or flue gases containing sulfur oxides comprising the steps of introducing the waste stack gases into a reaction zone; introducing an aqueous slurry containing an alkaline reagent into said zone for reaction of the reagent with said sulfur oxides to produce an effluent stream containing precipitated particulate; passing said effluent stream from the reaction zone to a filter zone and filtering said precipitated particulate from the stream in said filter zone; controlling the ratio of aqueous slurry to waste stack gases to maintain a relatively dry flow in said filter zone; and throttling the waste stack gases to maintain substantially that gas flow velocity required for optimum reaction of sulfur oxides and alkaline reagent in the reaction zone.

Preferably, the amount of alkaline reagent introduced into the reaction zone is approximately a stoichiometric amount based on the amount of sulfur oxides in said zone. In a preferred embodiment, the filter means in said filter zone is a fabric filter.

The present invention also resides in a spray reactor assembly particularly suitable for stack or flue gas desulfurization comprising a reactor vessel having a longitudinal axis and defining a reaction zone. An array of spaced apart nozzles oriented longitudinally with respect to the vessel axis are adapted to introduce a plurality of spray patterns into said reaction zone. Means are provided communicating said nozzles with a source of an alkaline reagent, including means to control the flow in said nozzles. Flue gas inlet means in the form of ducts are provided coaxial with and encompassing each of the nozzles. The apparatus includes a gas plenum chamber in cummunication with said gas inlet means, and means to control the gas flow from said plenum chamber to each of said gas inlet means.

Preferably, all surfaces of the gas inlet means are oriented at an angle with respect to the horizontal, so as to be self-cleaning.

DETAILED DESCRIPTION OF THE INVENTION AND DESCRIPTION OF THE DRAWINGS

The invention and the advantages thereof will become apparent upon consideration of the following specification with reference to the accompanying drawings, in which FIG. 1 is an overall perspective view of apparatus for the treatment of waste combustion gases in accordance with the concepts of the present invention;

Figure 1:
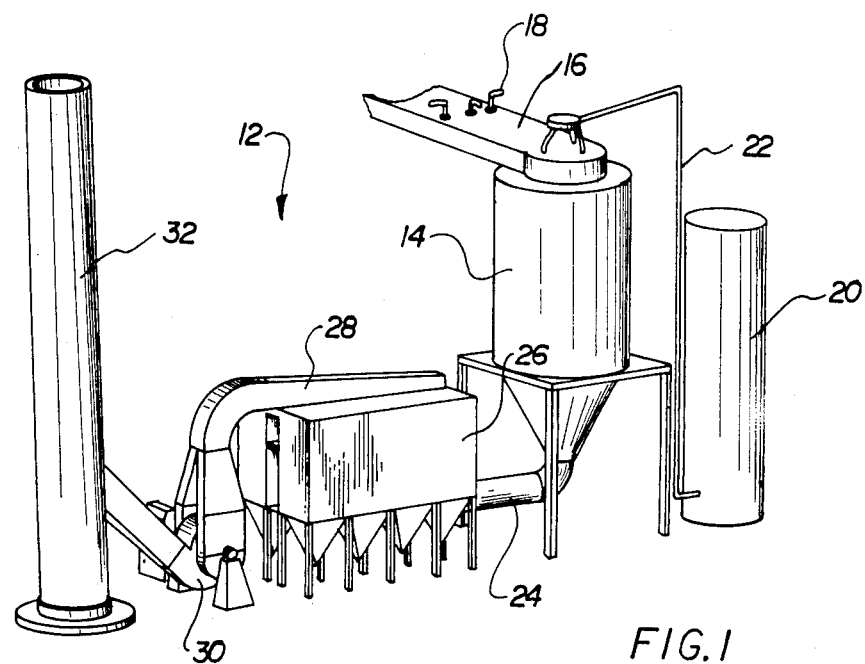

Referring to the drawings, and particularly to FIG. 1, there is illustrated a flue gas desulfurization apparatus according to the concepts of the present invention, generally designated by the numeral 12. Waste gases from a large steam generating station, not shown, are introduced into a spray reactor 14 by means of duct work 16, the duct work containing a series of damper-controls 18 upstream of the reactor. The duct work is connected to the reactors so as to feed the waste combustion gases to the top of the reactor. Also shown in FIG. 1 is a slake lime storage tank 20, with a line 22 adapted to pump lime slurry to the top of the reactor 14 for introduction into the reactor at approximately the same point of introduction of the waste flue gases from duct work 16.

At the bottom of the reactor 14, there is provided an outlet 24, which leads to a conventional baghouse fabric filter 26, in which particulate matter is removed from the waste gas stream. The waste gas stream passes through the baghouse filter by means of exhaust gas conduit 28 and booster fan 30, into stack 32 for dispersal into the atmosphere.

Generally, the reactor 14 is similar to the spray dryers and reactors used commonly in the chemical, food processing, and mineral preparation industries for many years. In operation, the sorbent solution or slurry is atomized into the incoming flue gas stream to increase the liquid/gas interface and to promote the mass transfer of sulfur dioxide from the gas to the slurry droplets, where the gas is absorbed. Simultaneously, the thermal energy of the gas evaporates the water in the droplets to produce a dry, powdered mixture of sulfate/sulfite and some unreacted alkali. Since the flue gas is not saturated and contains no liquid carryover, mist eliminators are not required. The particular reactions which occur in the reactor are conventional. By way of example, lime reacts with the sulfur dioxide in the following way:

$$SO_2 + Ca(OH)_2 \rightarrow CaSO_3 + H_2O$$

$$2CaSO_3 + O \rightarrow 2CaSO_4$$

After leaving the spray dryer, the solids-bearing gas passes through the fabric filter 26, where the dry product is collected and where a percentage of the unreacted alkali reacts with sulfur dioxide for further removal. The cleansed gas is then discharged through the fabric filter plenum to the induced draft fan 30 and stack 32.

Although a preferred sorbent choice of the spray dryer system is a lime slurry, other sorbents can be employed such as sodium carbonate. Sodium carbonate generally achieves a higher level of $SO_2$ removal, but lime has a substantial cost advantage over sodium carbonate. Also, the use of sodium alkalis tends to create disposal problems because the alkalis are water soluble, relatively speaking.

As compared to limestone, it has been determined that lime has an $SO_2$ removal efficiency of 85% at a stoichiometric ratio of about one. Hand-in-hand with removal efficiency, is the concept of alkali utilization. WHile 100% utilization is obtainable with lime by adjustment of the reactor, limestone typically gives about 60-70% utilization. Increased utilization allows for lower stoichiometric ratios and generates less waste product. It also permits optimizing the reactor to prevent condensation from occurring in the fabric filter.

Maintaining design temperature in the fabric filter also has the advantage that is allows a percentage of the unreacted alkali in the collected waste on the bag surface to react with remaining $SO_2$ in the flue gas, further optimizing the process.

With regard to avoiding wetting the fabric, it is desirable to maintain a 25°-35° temperature margin above saturation temperature for bag protection.

Figure 2:
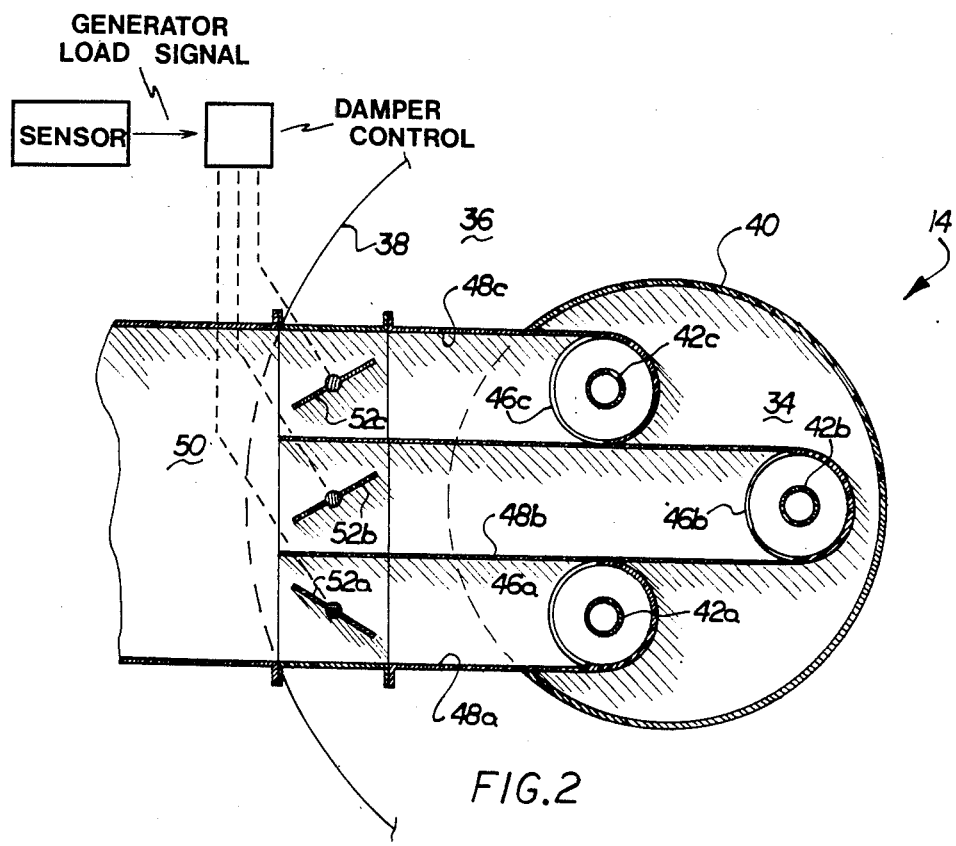
FIG. 2 is a plan section view taken along line 2—2 of FIG. 3 of a spray reactor unit in accordance with the concepts of the present invention.
Figure 3:
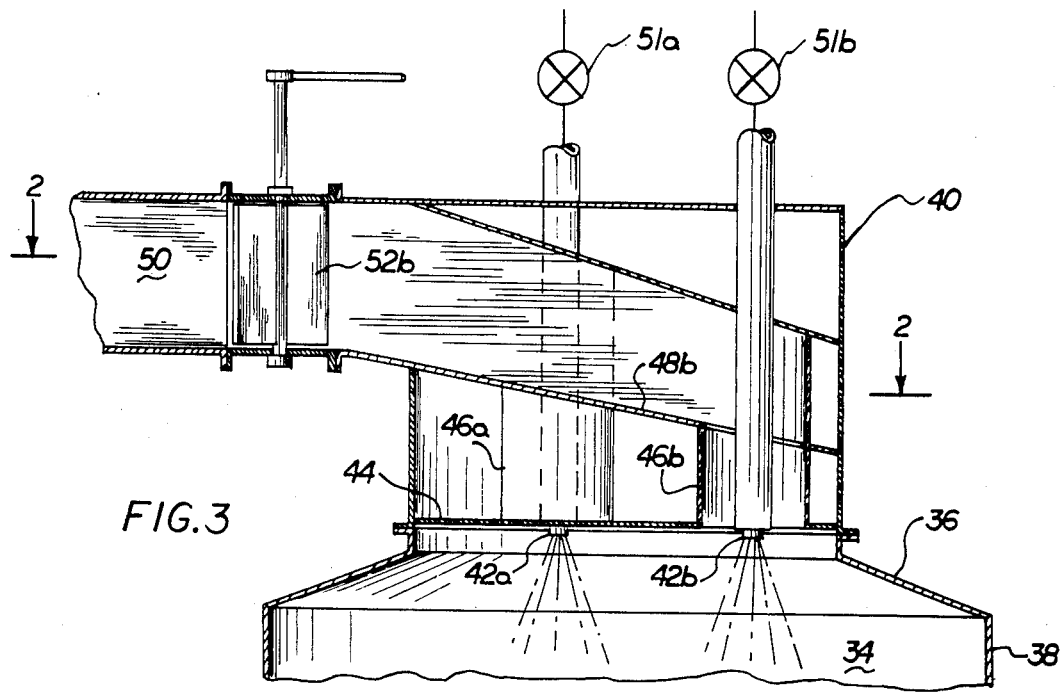
FIG. 3 is a section partial elevation view of the spray reactor apparatus of the present invention.

Details of the reactor 14 and particularly the head section, and reaction zone of the reactor, are shown in FIGS. 2 and 3. Referring first to FIG. 3, the upper part of the reactor comprises a primary reaction zone 34, which in the embodiment illustrated is defined by a frusto-conical surface 36 supported by a main cylindrical section 38 defining the body of the reactor. The top of the frusto-conical surface 36 supports a head section or penthouse 40, which in the embodiment of FIG. 3 is in the form of a cylindrical section seated on top of the frusto-conical surface, coaxial with the same. An array, in this embodiment a plurality of three nozzles, 42a, 42b, and 42c (see also FIG. 2), extend vertically downwardly through the penthouse, terminating in a plane perpendicular to the vertically extending axis of the reactor and slightly below the floor 44 of the penthouse.

Details of the nozzle itself are not critical, and by way of example, the nozzle can be similar to that shown in Eakin U.S. Pat. No. 3,110,444, patented Nov. 12, 1963, assigned to asignee of the present application, which gives a small angle cone pattern. The nozzle should be distinguished from an atomizing wheel, for instance the type of atomizing wheel disclosed in Cordua U.S. Pat. No. 3,080,122. An atomizing wheel is frequently employed in spray dryers for drying slurries, wherein the spinning wheel distributes the slurry in the form of a fine atomized spray into an annular gas stream. In a reactor for reaction of an alkaline reagent such as a lime slurry with sulfurous gases, it is advantageous to prevent contact of the slurry with the reactor wall, on which the reacted particles or lime could lodge and collect and agglomerate. It is a feature of the present invention that the nozzles are capable of providing such a narrow inverted cone pattern of sprayed particles, and the array of nozzles is disposed sufficiently inward of the reactor vessel that the downward atomized spray from the nozzles remains free of the reactor vessel walls.

As shown in FIG. 2, the nozzles, positioned in a triangular array or configuration, are located radially about a third of the way between the axis of the reactor and a plane defined by the confines of the reactor vessel.

Each nozzle is encompassed by a vertically extending coaxial duct section 46a, 46b, or 46c, the gas duct 46b encompassing in the lower section thereof, nozzle 42b. (FIG. 3). The duct 46b communicates with a sloping connecting or bridging duct 48b, which extends to the left in the head section 40 and communicates in turn with a plenum chamber 50 of the gas incoming duct 16. As shown in FIG. 2, the bridging duct 48b is positioned intermediate, bridging ducts 48a and 48c for nozzles 42a and 42c respectively; both of these bridging ducts communicating with plenum chamber 50 at one end and ducts 46a and 46c (surrounding nozzles 42a and 42c) at the other end.

Each duct is provided with a damper 52a, 52b, or 52c. Closing of the damper permits turndown of the gas flow into the reactor with turndown in the boiler load. A wide range of turndown ratios are available by the present invention. For instance, in the arrangement illustrated, the flow area into the reactor can be reduced by a third or even two thirds, depending upon steam generator load, simply by closing one or two of the dampers 52. This in turn permits maintaining the velocity of flow into the reactor at a predetermined desired level or near that level for optimum mixing of gases and reagent and, thus, optimum reaction. For instance, if the generator is operated at one third load, the gas flow volume is reduced to a third of full load flow. Closing two dampers 52 prevents a drop in the velocity of the gas flow into the reaction zone 34. Simultaneous with closing the dampers, the flow of slurry in one or two of the corresponding nozzles 42 would be stopped by valves 51 to maintain the proper ratio of slurry to gas flow volume. Normally, sufficient control is obtained by operating the dampers 52 at either an open or closed position, without regard to intermediate positions.

As illustrated in FIG. 3, the surfaces in the bridging gas ducts are at an angle with respect to the horizontal, permitting a self-cleaning action and minimizing ash accummulation.

Figure 4:
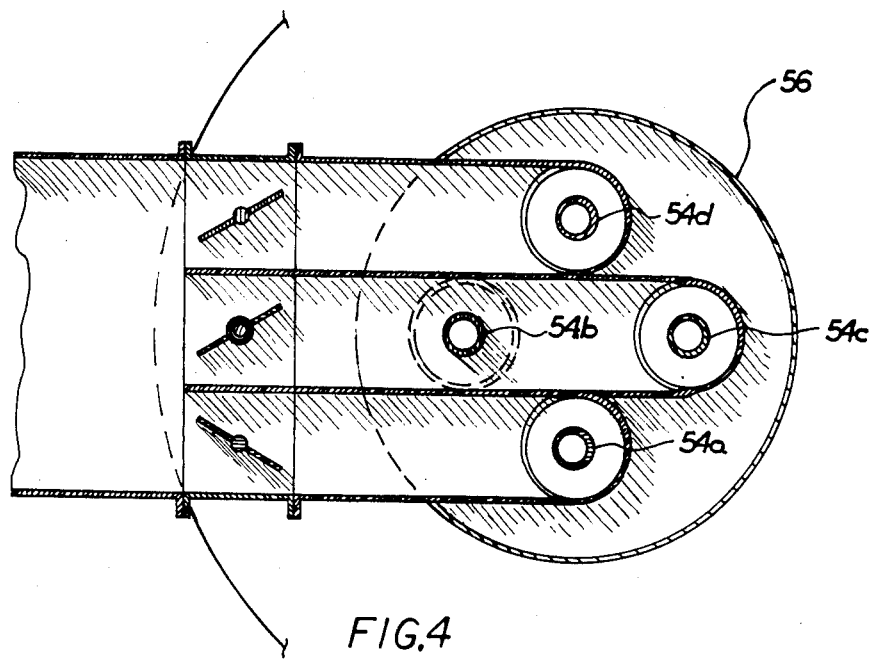
FIG. 4 is a plan section view of a reactor apparatus similar to FIG. 2 but of an embodiment in accordance with the concepts of the present invention, taken through line 4—4 of FIG. 5.
Figure 5:
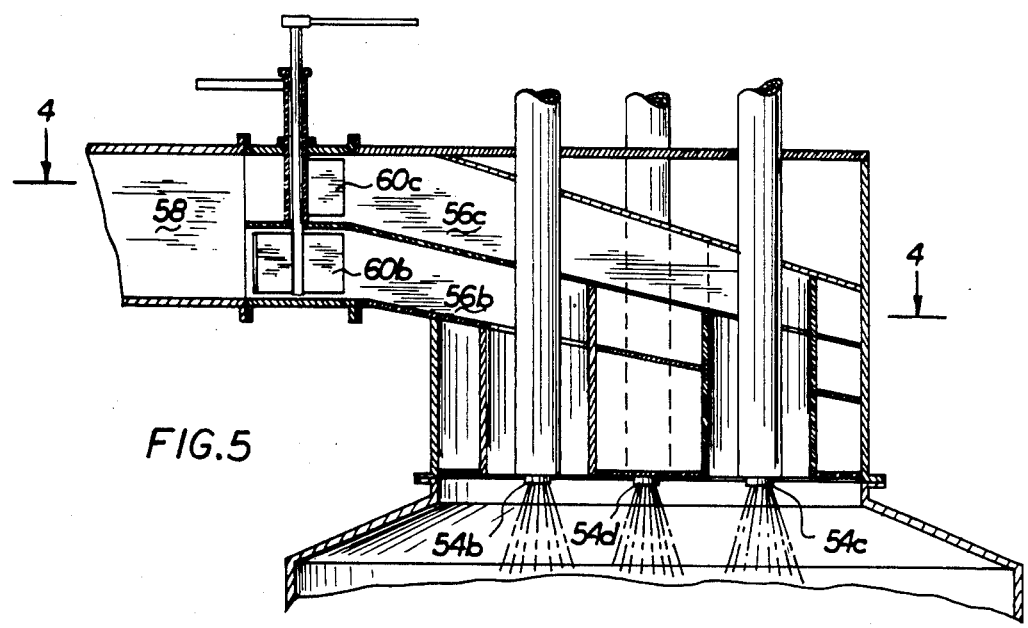
FIG. 5 is a section partial elevation view of the reactor of FIG. 4.
Figure 6:
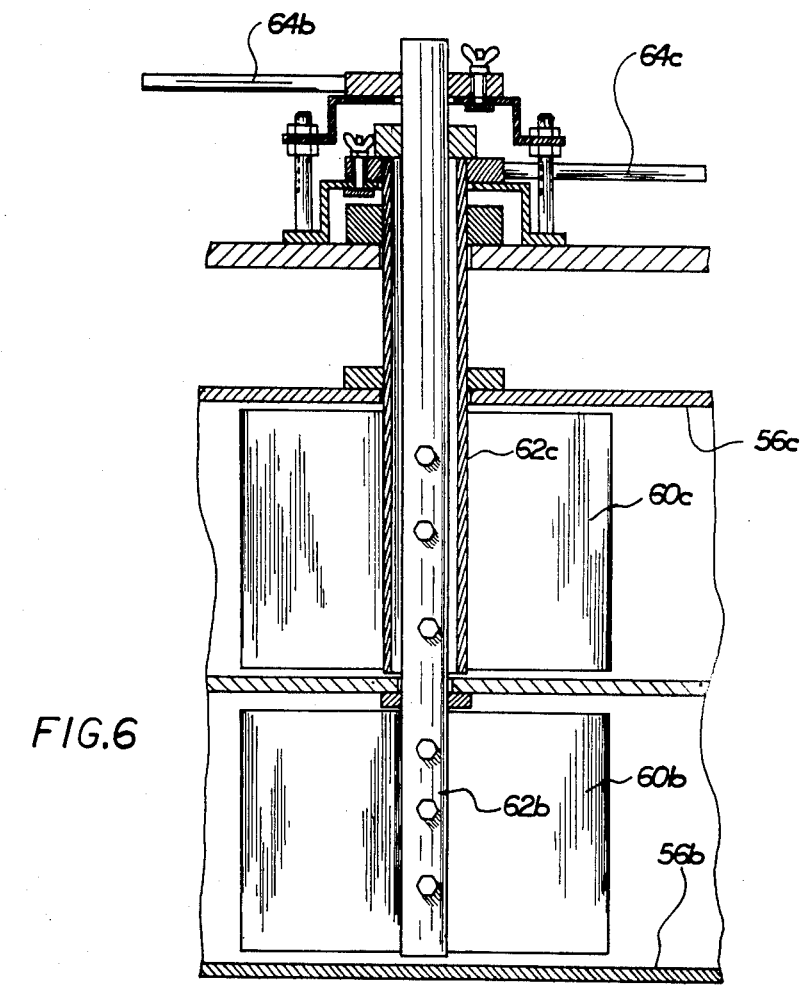
FIG. 6 is an enlarged elevation view of a part of the apparatus of FIG. 5, specifically illustrating a part of the damper controls of FIG. 5.

An embodiment of the present invention is illustrated in FIGS. 4–6. As shown in FIG. 4, four nozzles 54 are provided in an array in the reactor penthouse or head section. The nozzles are similar to those in the embodiment of FIG. 3, except that they are disposed in an approximately square pattern in an annulus about the center or axis of the head section 56.

Two of the nozzles, 54b and 54c, are in line. To provide separate bridging ducts leading to gas inlets encompassing both nozzles, one duct 56c is positioned above the other (56b), as shown in FIG. 5. Thus, the upper duct 56c leads to the gas inlet furthest removed from the plenum chamber 58 for the four ducts, the lower duct 56b leading to the gas inlet closest to the plenum chamber. All of the connecting ducts are provided with sloping surfaces, as in the embodiment of FIG. 3, and with individual dampers 60 for shutting off a particular gas duct in response to a reduction in boiler load. In actuality, because of the presence of four ducts, the turndown can be to a fourth of full load gas flow. As with the embodiment of FIG. 3, the centermost bridging ducts are positioned between the sidemost ducts.

The arrangement of FIG. 4 can be adapted to larger numbers of nozzles and gas inlets, for instance six nozzles or eight nozzles and a corresponding number of inlets, for greater control and potential turndown.

In very large stationary generating plants, very large reactors would be employed, requiring a large number of nozzles and corresponding gas inlets.

FIG. 6 illustrates details of an arrangement which may be employed for dampers positioned in ducts one above the other, both operable from above. The upper damper 60c is connected to a sleeve 62c which embraces the shaft 62b for the lower damper 60b. One lever 64c is connected to the sleeve 62c for actuation of the upper damper and a separate lever 64b is connected to the inner shaft 62b for opening and closing the lower damper. Suitable seals are provided to prevent escape of gases from either of the ducts.

Aside from dimensioning the relative components of the spray reactor to accommodate flows and locating the nozzles to avoid coating the reactor walls, respective dimensions are not critical. By way of example, in the case of a four nozzle arrangement the following table gives representative dimensions:

TABLE I

| Component | Dimension |
| --- | --- |
| Nozzle diameter | 1 foot |
| Head section diameter | 16 feet |
| Gas inlet diameter | 4½ feet |

The unit of Table I would be capable of handling a gas flow of about 200,000 ACFM*, at the rate of about 50,000 ACFM per nozzle. The gas flow velocity at each gas inlet would be about 3309 feet per minute, which is about optimum to promote mixing of a slurry stream and impinging gas flow. For one-half turndown, one can shut off the in-line gas inlets by closing the coaxially pivoted dampers 60b and 60c.

*Actual Cubic Feet Per Minute

Generally, the amount of slurry used is conditioned on gas flow and as a rule of thumb should be approximately a stoichiometric amount equal to about 5–10 pounds slurry per pound of atomizing gas, using a 40–60% concentrated slurry (pounds of reactant per pound of slurry). This requires a nozzle capacity of about 10,000 pounds per hour and the nozzles of Table I are dimensioned for this capacity.

Advantages of the present invention should be apparent. Experience has shown that an optimum gas flow velocity of a gas stream impinging on an atomized spray is about 2500–4000 feet per minute. Without the turndown capability afforded by the present invention, it would be possible for the gas flow velocity in a single nozzle reactor to drop to about 1500 feet per minute with reduced boiler load. The result would be far reduced efficiency of mixing. It is undesirable to increase the slurry flow to compensate for the loss of efficiency as this would result in loss of reactant and also would lower substantially the temperature of the effluent from the reactor to the point that condensation in the downstream filter could result. Such condensation would have an adverse affect on operation of the filter.

The present invention has been described with reference to use of a typical fabric-type baghouse filter. It is within the scope of the present invention that other types of filters can be employed. Also, the present invention has been described with reference to use of a lime slurry. Other alkaline reagents capable, at the temperature in the reactor zone, of giving a solid, dry sulfate or sulfite particulate, may be used.

Although the present invention is particularly useful with large steam generators which are subject to varying loads, the present invention broadly is adaptable to any application wherein hot gases are produced containing contaminants removable by reaction with an aqueous reagent to form a dry particulate.

It is apparent from the above description, that the control of the dampers 52 can be carried out manually in response to a generator load signal. Alternatively, if desired, the damper closing can be carried out automatically by a suitable damper control as illustrated in FIG. 2, in response to a generator load signal, from a generator load sensing means, following well-known practice.

What is claimed is:

1. A spray reactor assembly particularly suitable for stack gas desulfurization, comprising a reactor vessel having a longitudinal axis and longitudinally extending confines embracing said axis and defining an enlarged reaction zone;

means defining a head section above said reactor vessel;

an annular array of at least three equally spaced-apart nozzles in said head section oriented longitudinally with respect to said vessel axis and terminating in a plane perpendicular to the vessel axis, said array of nozzles lying within a plane defined by and extending upwardly from said longitudinally extending confines;

means communicating said nozzles with a source of alkaline reagent, including means to control the flow in said nozzles; with the sizing of the reactor vessel and location of nozzles in the head section being effective to avoid coating the reactor walls with alkaline reagent or reactant product;

a plurality of stack gas inlet means, wherein each of said stack gas inlet means is in the form of duct means coaxial with and encompassing at least one of said nozzles;

a gas inlet plenum chamber;

a plurality of bridging duct means, wherein each bridging duct means corresponds with one of said stack gas inlet means and extends between said corresponding one of said stack gas inlet means and said plenum chamber; and damper means in each of said bridging duct means to open and close such duct means.

2. The apparatus of claim 1 wherein said array of nozzles are spaced in an annular plane about a third of the way between said vessel axis and said plane defined by the longitudinally extending confines.

3. The apparatus of claim 1 wherein said vessel axis is vertically oriented, and wherein each of said bridging duct means has surfaces angled with respect to the horizontal.

4. The apparatus of claim 1 comprising three nozzles defining a triangular configuration, with the bridging duct means being in a side-by-side relationship.

5. The apparatus of claim 1 comprising at least four nozzles, with two of the bridging duct means being located one above the other, the remaining two duct means being contiguous with an on opposite sides of the upper and lower duct means.

6. The apparatus of claim 1 wherein said alkaline reagent is a lime slurry.

7. A spray reactor assembly particularly suitable for flue gas desulfurization, comprising a reactor vessel having a longitudinal axis and defining an enlarged reaction zone;

an array of spaced-apart nozzles oriented longitudinally with respect to said vessel axis adapted to introduce a plurality of spray patterns into said reaction zone;

an alkaline reagent source;

means communicating said nozzles with said alkaline reagent source, including means to control the flow in said nozzles;

a gas inlet plenum chamber;

flue gas inlet means in the form of plural duct means each being coaxial with and encompassing one of said nozzles; said flue gas inlet means communicating with said plenum chamber; and means to control the flow from said plenum chamber to each of said flue gas inlet means;

the sizing of said reactor vessel and location of the nozzles being effective to avoid coating the reactor walls with alkaline reagent or reaction product.

8. A spray reactor assembly for cleansing waste stack gases containing sulfur oxides comprising a reactor vessel having an enlarged reaction zone;

means for introducing waste stack gases into said reaction zone;

spray means for introducing an aqueous slurry containing an alkaline reagent into said zone for reaction of said reagent with said sulfur oxides to produce an effluent stream containing precipitated particulate;

filter means suitable for filtering precipitated particulate;

means for passing said effluent stream from said reaction zone to said filter means, to filter said precipitated particulate from the effluent stream;

means for controlling the ratio of aqueous slurry flow to waste stack gases to maintain a relatively dry flow in said filter means; and control means for varying the area of flow of the waste stack gases into the reaction zone to maintain substantially that gas flow velocity required for optimum reaction of sulfur oxides and alkaline reagent in the reaction zone;

the sizing of the reactor vessel and location of the spray means being effective to avoid coating the reactor walls with alkaline reagent or reaction product.

9. Th assembly of claim 8 including a sensing means for sensing the generator load, the control means being responsive to a load signal from said sensing means.

* * * * *